United States Patent
Shu et al.

(10) Patent No.: US 11,674,253 B2
(45) Date of Patent: Jun. 13, 2023

(54) INTELLIGENT CLOTHING WASHING MANAGEMENT DEVICE, METHOD AND WASHING MACHINE

(71) Applicant: QINGDAO HAIER WASHING MACHINE CO., LTD., Shandong (CN)

(72) Inventors: Hai Shu, Shandong (CN); Sheng Xu, Shandong (CN); Yang Li, Shandong (CN); Chenyu Ji, Shandong (CN); Shuchun Wang, Shandong (CN); Yan Li, Shandong (CN); Junming Yin, Shandong (CN)

(73) Assignee: QINGDAO HAIER WASHING MACHINE CO., LTD., Shandong (CN)

( * ) Notice: Subject to any disclaimer, the term of this patent is extended or adjusted under 35 U.S.C. 154(b) by 262 days.

(21) Appl. No.: 16/937,764

(22) Filed: Jul. 24, 2020

(65) Prior Publication Data
US 2020/0354874 A1    Nov. 12, 2020

Related U.S. Application Data

(62) Division of application No. 15/556,818, filed as application No. PCT/CN2015/083310 on Jul. 3, 2015, now Pat. No. 10,753,029.

(51) Int. Cl.
*D06F 34/28* (2020.01)
*G05B 13/04* (2006.01)
(Continued)

(52) U.S. Cl.
CPC .............. *D06F 34/28* (2020.02); *D06F 34/18* (2020.02); *D06F 35/005* (2013.01); *G05B 13/04* (2013.01);
(Continued)

(58) Field of Classification Search
CPC ........ D06F 34/18; D06F 34/28; D06F 35/005; D06F 2101/06; D06F 2103/04;
(Continued)

(56) References Cited

U.S. PATENT DOCUMENTS

| 7,174,227 B2 | 2/2007 | Kobayashi et al. |
| 2005/0022317 A1 | 2/2005 | Shaffer |

(Continued)

FOREIGN PATENT DOCUMENTS

| CN | 1714191 A | 12/2005 |
| CN | 102220681 A | 10/2011 |

(Continued)

OTHER PUBLICATIONS

First Office Action dated Aug. 1, 2018 issued by The State Intellectual Property Office of People's Republic of China in corresponding Chinese Patent Application No. 201510105260.X and translation (10 pages).

(Continued)

*Primary Examiner* — Joseph L. Perrin
(74) *Attorney, Agent, or Firm* — Buchanan Ingersoll & Rooney PC (57) ABSTRACT

The present disclosure discloses a method for washing clothing by an intelligent clothing washing management device, comprising following steps. The method includes selecting one or more of categories of clothing displayed on a clothing module and displaying a selected clothing model in an area to be washed. The method also includes clicking on a start item, a washing procedure recommendation module analyzing and automatically recommending washing parameters according to the selected clothing model. The method further includes applying the washing parameters displayed and recommended, a processing module receiving washing parameters recommended by the washing proce- (Continued)

dure recommendation module and controlling a washing device; wherein the washing parameters at least include washing time, washing temperature and rotation speed.

18 Claims, 4 Drawing Sheets

(51) Int. Cl.
  *G05B 17/02* (2006.01)
  *D06F 34/18* (2020.01)
  *D06F 35/00* (2006.01)
  *D06F 103/04* (2020.01)
  *D06F 103/06* (2020.01)
  *D06F 101/06* (2020.01)
  *D06F 103/38* (2020.01)
  *D06F 105/52* (2020.01)
  *D06F 103/18* (2020.01)
  *D06F 105/56* (2020.01)
  *D06F 105/58* (2020.01)

(52) U.S. Cl.
  CPC .......... *G05B 17/02* (2013.01); *D06F 2101/06* (2020.02); *D06F 2103/04* (2020.02); *D06F 2103/06* (2020.02); *D06F 2103/18* (2020.02); *D06F 2103/38* (2020.02); *D06F 2105/52* (2020.02); *D06F 2105/56* (2020.02); *D06F 2105/58* (2020.02)

(58) Field of Classification Search
  CPC ............ D06F 2103/06; D06F 2103/18; D06F 2103/38; D06F 2105/52; D06F 2105/56; D06F 2105/58; G05B 13/04; G05B 17/02
  See application file for complete search history.

(56) References Cited

U.S. PATENT DOCUMENTS

| | | |
|---|---|---|
| 2005/0109070 A1 | 5/2005 | Kobayashi et al. |
| 2008/0276964 A1 | 11/2008 | Hendrickson et al. |
| 2013/0086520 A1 | 4/2013 | Beaudet et al. |
| 2013/0239337 A1 | 9/2013 | Kim et al. |
| 2014/0018962 A1 | 1/2014 | Jung et al. |
| 2014/0058553 A1 | 2/2014 | Lee et al. |
| 2014/0326067 A1 | 11/2014 | Chanda et al. |
| 2016/0215430 A1 | 7/2016 | Ha et al. |
| 2016/0258104 A1 | 9/2016 | James |
| 2018/0305851 A1 | 10/2018 | Kwon et al. |

FOREIGN PATENT DOCUMENTS

| | | |
|---|---|---|
| CN | 103266452 A | 8/2013 |
| CN | 203334040 U | 12/2013 |
| JP | 2003210887 A | 7/2003 |
| JP | 2006075527 A | 3/2006 |
| JP | 2013070831 A | 4/2013 |
| WO | 2013021330 A1 | 2/2013 |
| WO | 2015055239 A1 | 4/2015 |

OTHER PUBLICATIONS

Extended European Search Report dated Feb. 23, 2018 issued by the European Patent Office in corresponding EP Application No. 15884330.0 (9 pages).

Notice of Reasons for Refusal dated Jan. 31, 2019 issued by the Japanese patent Office in corresponding Japanese Patent Application No. 2017-547439 and translation (20 pages).

International Search Report (PCT/ISA/210) dated Dec. 17, 2015, by the Chinese Patent Office as the International Searching Authority for International Application No. PCT/CN2015/083310.

INTELLIGENT CLOTHING WASHING MANAGEMENT DEVICE, METHOD AND WASHING MACHINE

CROSS REFERENCE TO RELATED APPLICATIONS

This application is a divisional of U.S. patent application Ser. No. 15/556,818, filed on Sep. 8, 2017, entitled "INTELLIGENT CLOTHING WASHING MANAGEMENT DEVICE, METHOD AND WASHING MACHINE," which claims the benefit of National Stage Application No. PCT/CN2015/083310, filed Jul. 3, 2015, which claims priority to Chinese Patent Application No. 201510105260.X, filed Mar. 10, 2015, the disclosures of which are incorporated herein by reference in their entireties.

TECHNICAL FIELD

The present disclosure relates to a technical field of intelligent washing and particularly relates to an intelligent clothing washing management device, a method and a washing machine.

BACKGROUND

At present, household washing machines in the market provide users with popular procedures, and complete the washing operation according to procedures selected by users before washing. The washing processes usually includes washing time, washing temperature, washing speed, washing water level, rinsing time, dehydration time, etc., as specified in a selected procedure, far from meeting the needs for diversified washing of users. And pertinence of these washing procedures for clothing of different materials or different colors is relatively low. Particularly, during the washing of clothing in household, the clothing often consists of different materials and different colors and vary a lot. If users choose improper washing procedures, it is possible that the clothing is not clean washed, or worn and torn, or deformed or being fade with each other and so on. Although appropriate washing procedures can be prepared based on daily wash experiences, it is unpractical during the washing of clothing in household with the alternation of time and season and the constant replacement of clothing.

However, with the continuous progress of science and technology and society, remote control of intelligent washing machines through intelligent terminal equipment has become increasingly common. As more and more intelligent washing machines gradually enter our house, APP remote control, as an important feature of intelligent washing machines, has drawn a lot attention. A powerful and intelligent APP brings users more convenience and enhances the interactive property, sense of experience and practicality when users use it.

Based on the description above, an intelligent APP is necessary, which can preferably recommend the most appropriate washing procedure and control the washing equipment automatically according to various features of clothing to be washed.

SUMMARY

The technical problem to be solved by the present disclosure is to overcome the shortcomings of the prior art and to provide an intelligent clothing washing management device and method. The management device recommends the most appropriate washing procedures based on different types and materials of clothing selected by users, and gives the best washing advices according to different characteristics of clothing selected by users. For example, it reminds users that clothing of different colors is not suitable to be washed together according to different colors of clothing.

An intelligent clothing washing management device is provided in the present disclosure, and it at least comprises a clothing module, a washing procedure recommendation module, a storage module and a processing module. The management device is arranged on an intelligent terminal, and the intelligent terminal is communicatively connected with a washing device. The washing procedure recommendation module, according to the clothing model selected by the clothing module, recommends preferred washing parameters by information stored in the storage module. The processing module receives the washing parameters recommended by the washing procedure recommendation module and controls the washing device.

Preferably, the management device further comprises a voice module, and the voice module is connected with the clothing module and the processing module respectively. The voice module receives voice information input by a microphone of the intelligent terminal and clothing model is selected in the clothing module by entering the voice information. The washing procedure recommendation module, according to information stored in the storage module of the clothing selected, recommends preferred washing parameters. The processing module further analyses and processes the data, and controls the washing device.

Preferably, the clothing module includes clothing type and clothing information. The clothing information at least includes clothing material and clothing color. The clothing type at least includes type classified by clothing washing strength, and it includes but not limited to strong class, gentle class, jeans class, large stuff class, special class and stubborn class.

Preferably, the clothing information further includes clothing name, washing strength, clothing classification and clothing weight.

Preferably, the storage module stores clothing models in the clothing module and washing parameters corresponding to one type of clothing model and/or a mixture of more than one type of clothing models. The washing parameters include washing time, washing temperature and rotation speed.

Preferably, the washing parameters further include soaking time, rinsing time, dehydration time and water level.

Preferably, the management device further comprises an additional function module. The additional function module recommends preferred washing parameters according to the washing procedure recommendation module, the additional function module is set and displayed at an intelligent terminal and is selectable and operable. The additional function module includes additional functions from any one of drying, a detergent, a softener or a combination thereof.

Preferably, it further comprises a reminder module and the reminder module reminds that clothing selected is not suitable for mixed washing and/or is beyond the preset weight.

The present disclosure provides a method for washing clothing by an intelligent clothing washing management device, comprising the following steps:

S1: Select one or more of categories of clothing model displayed on the clothing module and the selected clothing model is displayed in a to-be-washed area;

S2: Click on the start, the washing procedure recommendation module analyzes and automatically recommends washing parameters according to the selected clothing model;

S3: Apply displayed and recommended washing parameters, the processing module receives washing parameters recommended by the washing procedure recommendation module and controls the washing device; the washing parameters at least include washing time, washing temperature and rotation speed.

Preferably, in step S1, when clothing model of a displayed category is selected, times that each type of clothing model is selected indicates that the type of clothing model is selected for several pieces.

Preferably, in step S1, clothing model in the to-be-washed area is cancellable.

Preferably, in step S2, if clothing model selected is not suitable for mixed washing and/or is beyond the preset weight at the time of analysis, reminders automatically pop up.

Preferably, the washing parameters further include soaking time, rinsing time, dehydration time and water level.

Preferably, the categories of clothing at least include categories classified by clothing washing strength, and it includes but not limited to strong class, gentle class, jeans class, large stuff class, special class and stubborn class.

Preferably, the clothing model in the clothing module is stored in the storage module, the storage module also stores preferred washing parameters corresponding to the clothing model and recommends preferred washing parameters based on the information of the selected clothing model stored through the storage module.

Preferably, when a plurality of categories according to the displayed categories are selected and at least special class are included, the preferred washing parameters are the washing parameters corresponding to clothing model with the greatest cumulative weight under the special class.

Preferably, when strong class, gentle class, jeans class, large stuff class and stubborn class are selected as a plurality of categories from the displayed categories, the preferred washing parameters are the washing parameters corresponding to clothing model with the greatest cumulative weight.

Preferably, the management device further comprises an additional function module. The additional function module recommends preferred washing parameters according to the washing procedure recommendation module, the additional function module is set and displayed at an intelligent terminal and is selectable and operable. The additional function module includes additional functions from any one of drying, a detergent, a softener or a combination thereof.

The present disclosure further provides an intelligent washing machine, and it at least comprises a communication module and a control module. The communication module is communicatively connected with the intelligent clothing washing management device. The communication module receives an operation instruction transmitted by the intelligent clothing washing management device and sends operation instructions to the control module. The control module controls the intelligent washing machine to perform corresponding operations in accordance with washing parameters set by the intelligent clothing washing management device.

Preferably, the washing parameters include washing time, washing temperature, rotation speed, soaking time, rinsing time, dehydration time and water level.

In the present disclosure, an intelligent clothing washing management device with a friendly and powerful interface is provided. When clothing model of different types and materials is chosen, the management device further analyzes and processes according to the selected situation and recommends a suitable washing procedure, including but not limited to soaking time, washing time, washing temperature, washing speed, rinsing time, dehydration time, water level and so on. Users can follow the recommended washing process to track and know the progress of clothing washing in real time.

DETAILED DESCRIPTION

With the rise of Internet of Things technology, intelligent home appliances will be the future development trend, and the degree of intelligence of intelligent washing machine equipment gets higher and higher. At present, intelligent washing machine equipment generally control the user terminal equipment through the screen operation of terminal equipment such as mobile phones and tablet computers. However, APPs are particularly important in terms of functionality and intelligence. Therefore, an intelligent clothing washing management device is provided in the present disclosure. It is designed to help users in the choice of washing clothing and recommend a more appropriate washing procedure. It enhances the control convenience of the man-machine interaction and enables users to experience more humanized and intelligent life.

The disclosure will be further described as follows with reference to the accompanying drawings and specific embodiments.

Figure 1:
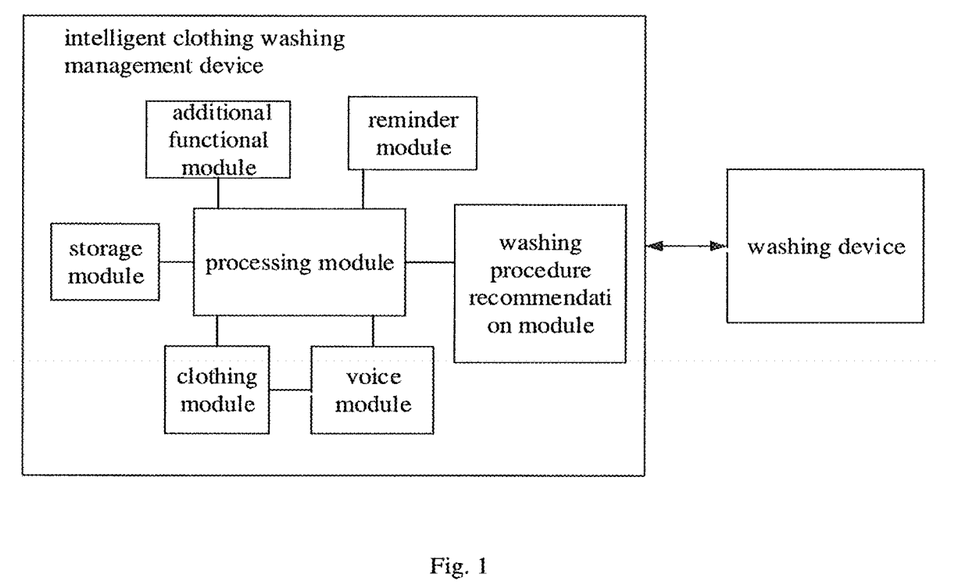
FIG. 1 is a block diagram showing an interactive structure of an intelligent clothing washing management device and an intelligent washing machine according to an embodiment of the present disclosure.

An intelligent clothing washing management device is provided in the present disclosure, as shown in FIG. 1, the management device comprises a clothing module and a washing procedure recommendation module, a storage module and a processing module. The clothing module includes clothing type and clothing information. The clothing information includes clothing material, clothing color, clothing weight, clothing name, washing strength, clothing classification and clothing weight. The clothing type at least includes type classified by clothing washing strength, and it includes but not limited to strong class, gentle class, jeans class, large stuff class, special class and stubborn class. The storage module stores clothing model in the clothing module and washing parameters corresponding to one type of clothing model and/or a mixture of more than one type of clothing models.

Figure 2:
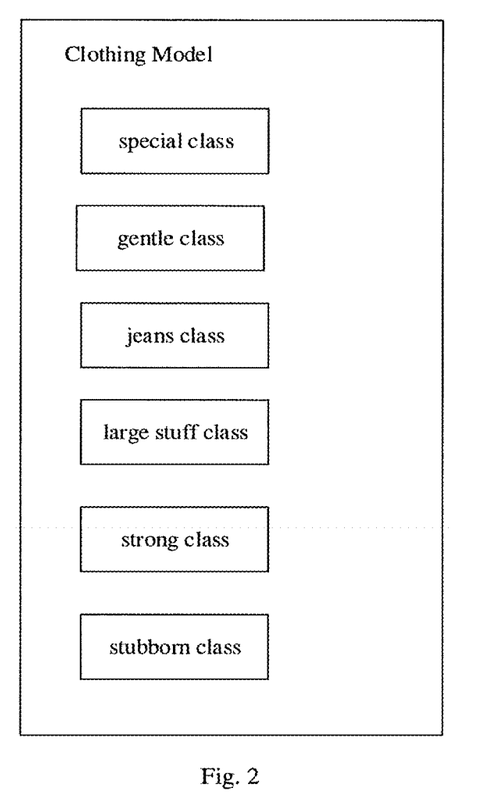
FIG. 2 is a block diagram showing a first level menu of the clothing module of an embodiment of the present disclosure.
Figure 3:
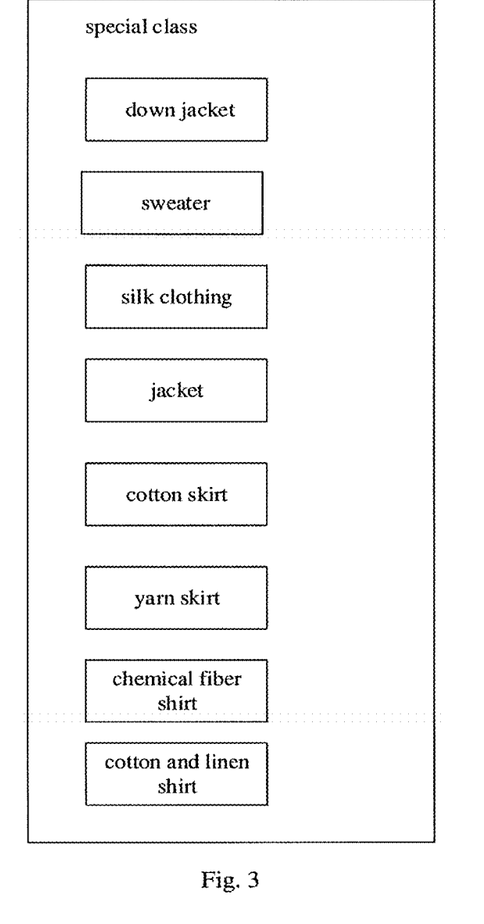
FIG. 3 is a block diagram showing a second level menu of special classes of the clothing module of an embodiment of the present disclosure.

Concretely, open the intelligent clothing washing management device, as shown in FIG. 2, choose the clothing module and a first level menu is shown as the following categories, including strong class, gentle class, jeans class, large stuff classes, special class and stubborn class. Choose one category from the first level menu, enter the category and it shows a further category from the second level menu. As shown in FIG. 3, it shows the content of the second level menu of the special class in the first level menu. Strong class includes linen jacket, linen trousers, cotton underwear, children's jacket and children's underwear. Gentle class includes chemical fiber jacket and chemical fiber trouser. Jeans class includes jeans coat and jeans trousers. Large stuff class includes bed sheet, quilt cover, linen curtain, yarn weight curtain and blanket. Special class includes down jacket, sweater, silk clothing, jacket, cotton skirt, yarn skirt, chemical fiber shirt and cotton and linen shirt. Stubborn class includes school uniform and work clothe. Choose one category from the second level menu to enter the third level menu and it shows the specific clothing model in the category. Each piece of specific clothing model is set with a unique number, which is easy to manage and distinguish. And each piece of clothing model includes clothing information of itself which can be edited and modified base on needs.

Further, the management device at least includes six levels of washing strength which is classified by washing strength from low to high according to clothing types. The strength. The corresponding symbols are arranged as L6>L5>L4>L3>L2>L1 from large to small, as shown in Table 1. Corresponding symbols of the clothing in categories included in each of the above-mentioned clothing types, a set weight of clothing corresponding to each category and a weight of each piece of clothing are estimated values which are set after tests. The washing strength levels corresponding to categories of clothing are arranged as L6>L52>L51>L4>L3>L2>L16>L15>L14>L13>L12>L1 from large to small, as shown in Table 2.

TABLE 1

| Levels of washing strength | | | | | | |
|---|---|---|---|---|---|---|
| clothing types | special class | gentle class | jeans class | large stuff class | strong class | stubborn class |
| levels of washing strength symbols | the first level L1 | the second level L2 | the third level L3 | the fourth level L4 | the fifth level L5 | the sixth level L6 |

TABLE 2

| Table of qualities of corresponding clothing | | | | | | |
|---|---|---|---|---|---|---|
| Names of clothing | linen jacket | linen trousers | cotton underwear | children's jacket | children's underwear | chemical fiber jacket |
| Symbol | L51 | L51 | L52 | L52 | L52 | L2 |
| Weight | 1 | 0.5 | 0.07 | 0.3 | 0.05 | 0.8 |
| Name of clothing | chemical fiber trousers | jeans coat | jeans trousers | bed sheet | quilt cover | linen curtain |
| Symbol | L2 | L3 | L3 | L4 | L4 | L4 |
| Weight | 0.18 | 1 | 0.6 | 0.6 | 1.2 | 3 |
| Name of clothing | yarn weight curtain | blanket | down jacket | sweater | silk clothing | jacket |
| Symbol | L13 | L4 | L15 | L14 | L12 | L11 |
| Weight | 2 | 3 | 1.5 | 1.2 | 0.5 | 1 |
| Name of clothing | cotton skirt | yarn skirt | chemical fiber shirt | cotton and linen shirt | school uniform | work clothes |
| Symbol | L13 | L13 | L16 | L16 | L6 | L6 |
| Weight | 0.4 | 0.3 | 0.2 | 0.18 | 0.6 | 0.6 | symbol Ln stands for a level of washing strength in the six levels of washing strength, and the symbol Lnv stands for washing strength of a lower grade category included in each level of the six levels of washing strength, wherein, n and v are any natural numbers being chosen from 1 to 9. And the larger the value of n is, the higher the level of washing strength is. If n is the same, then the value of v is compared, and the greater the value of v is, the higher the level of washing strength is. Each type of clothing according to their own characteristics, the corresponding levels of washing strength increase by levels in accordance with washing As shown in Table 3, according to the listed congruent relationships of names of clothing and symbols for levels of washing strength corresponding to names of clothing, washing parameters corresponding to some clothing are listed in the table. The washing parameters are the best washing data obtained by a large number of experiments. Categories of clothing are corresponding to different washing parameters, according to characteristics such as materials. The washing parameters include but are not limited to soaking time, rotation speed, washing time, rinsing time, dehydration time, washing temperature and water level.

TABLE 3

| Washing parameters corresponding to a category of clothing | | | | | | | | | | | | |
|---|---|---|---|---|---|---|---|---|---|---|---|---|
| | Symbols | | | | | | | | | | | |
| Washing parameters | L11 | L12 | L13 | L14 | L15 | L16 | L2 | L3 | L4 | L51 | L52 | L6 |
| Washing/min | 15 | 15 | 20 | 20 | 15 | 20 | 15 | 15 | 20 | 15 | 15 | 75 |
| Rinsing/time | 2 | 3 | 2 | 3 | 3 | 3 | 3 | 3 | 3 | 3 | 3 | 3 |

TABLE 3-continued

Washing parameters corresponding to a category of clothing

| Washing parameters | Symbols | | | | | | | | | | | |
|---|---|---|---|---|---|---|---|---|---|---|---|---|
| | L11 | L12 | L13 | L14 | L15 | L16 | L2 | L3 | L4 | L51 | L52 | L6 |
| Dehydration/min | 3 | 3 | 3 | 3 | 3 | 3 | 3 | 3 | 3 | 3 | 3 | 3 |
| Temperature/° C. | none | none | 30 | none | 30 | 40 | 30 | 30 | 30 | 30 | 40 | 30 |
| Rotation Speed/rpm | not dry | not dry | 600 | 600 | 600 | 1000 | 800 | 800 | 800 | 1000 | 1000 | 1000 |

According to the washing parameters set in each level of washing strength of clothing in the table above, when a user selects laundry in the same level, the device recommends washing parameters corresponding to the level. When a user selects laundry in different levels: 1) if the laundry at least includes the special class, that is, any one or more than one of levels of washing strength from L11 to L16 in the special class. And then the device preferably recommends washing parameters corresponding to clothing with the greatest cumulative weight in the special class. 2) If the clothing includes multiple items of strong class, gentle class, jeans class, large stuff class and stubborn class except for special class, then the device preferably recommends washing parameters corresponding to clothing with the greatest cumulative weight.

The management device is arranged on an intelligent terminal, and the intelligent terminal is communicatively connected with a washing device. The washing procedure recommendation module, according to the clothing model selected by the clothing module, recommends preferred washing parameters by information stored in the storage module. The processing module receives the washing parameters recommended by the washing procedure recommendation module, and controls the washing device. The management device further comprises an additional function module. The additional function module recommends preferred washing parameters according to the washing procedure recommendation module, the additional function module is set and displayed at an intelligent terminal and is selectable and operable. The additional function module includes additional functions from any one of drying, a detergent, a softener or a combination thereof.

The management device further comprises a voice module, and the voice module is connected with the clothing module and the processing module respectively. The management device is open and the voice module is selected, the voice module receives voice information input by a microphone of the intelligent terminal, and starts the voice module to enter the corresponding voice information according to voice prompts and operates. Clothing model is selected in the clothing module, according to voice prompts and by entering the voice information. The washing procedure recommendation module, according to information stored in the storage module of the clothing model selected, recommends preferred washing parameters. The processing module further analyses and deals with preferred washing parameters, and controls the washing device.

The disclosure further provides a method for washing clothing by an intelligent clothing washing management device, comprising the following steps:

S1: Select one or more of categories of clothing model displayed on the clothing module, and the selected clothing model is displayed in a to-be-washed area;

S2: Click on the start, the washing procedure recommendation module analyzes and automatically recommends washing parameters according to the selected clothing model;

S3: Apply displayed and recommended washing parameters, the processing module receives washing parameters recommended by the washing procedure recommendation module and controls the washing device; the washing parameters include washing time, washing temperature and rotation speed.

Figure 4:
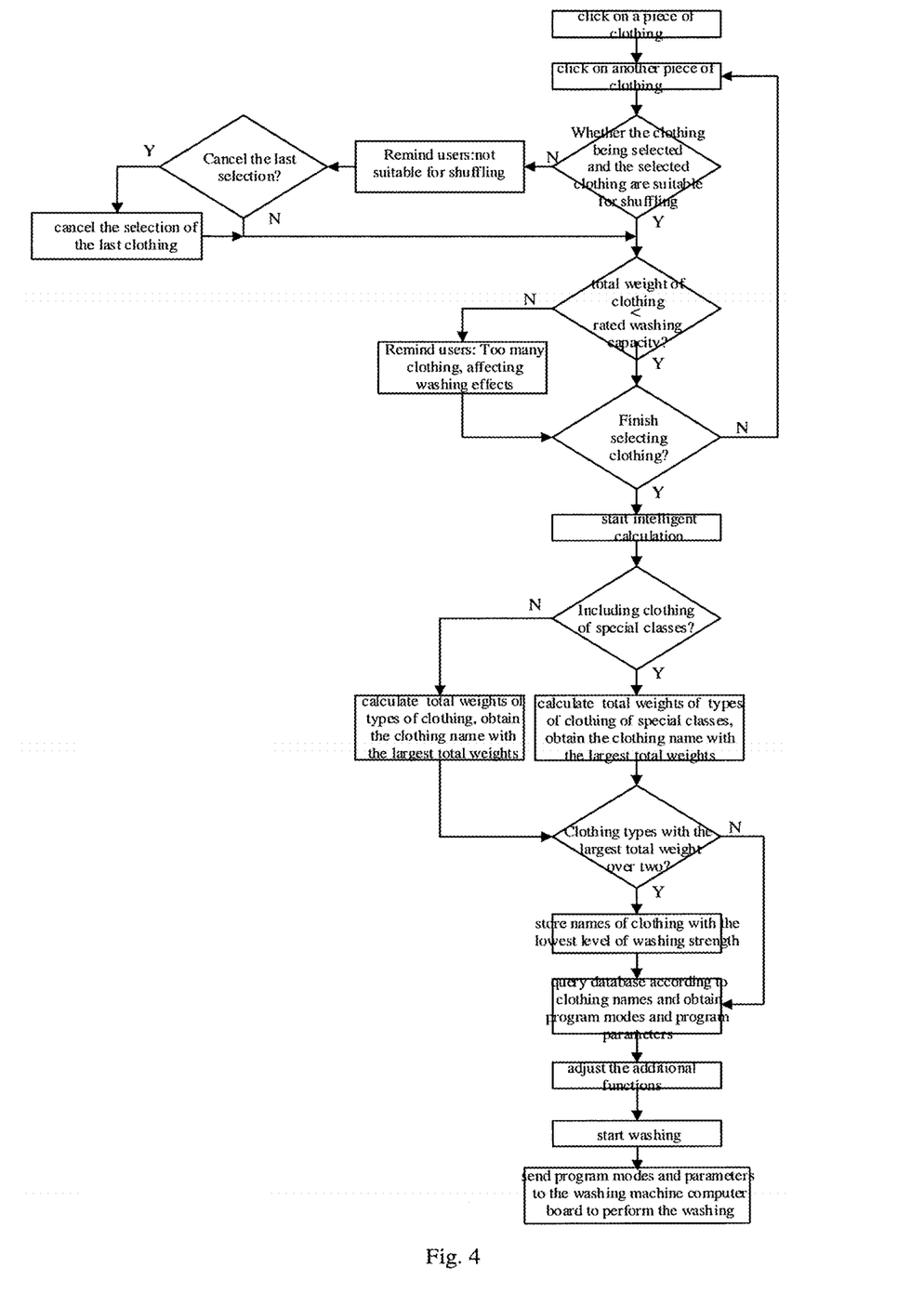
FIG. 4 is a flow chart of recommending washing procedures according to clothing selected in an embodiment of the present disclosure.

Further, see FIG. 4, specific steps of the method are as follows:

(1) Operate the intelligent clothing washing management device, select the clothing module in an interface that can be operated and selected, and select one of categories shown in an interface of the clothing module which can be operated and selected. Enter the lower category of the category and choose the first piece of clothing model thereof as the selected clothing model.

In particular, clothing model is automatically added to the area to be washed after being selected, being convenient for users to check what clothing model are selected and being able to check washing frequency statistics of the clothing model selected. Wherein, the to-be-washed area is automatically displayed by selecting clothing model, and clothing model displayed in the to-be-washed area can be operated. In the to-be-washed area, if a certain category of clothing model displays a number bigger than one, it means that the category of clothing model includes several pieces of clothing models to be washed, and if users need to delete clothing models already selected, press on the clothing models in the area to be washed and slide upwards, then the clothing models is deleted.

For example, select the clothing module, then select special class in a first level menu displayed, enter the second level menu displayed under the special class and select down jacket, enter a third level menu displayed under the selected down jacket clothing model, and choose three pieces of any clothing models and it displays that three pieces of down jackets are in the to-be-washed.

(2) Continue to select one of the categories displayed, enter a lower category of the category and choose a next clothing model from the clothing model selected therein. The system further determines whether it is suitable for mixed washing based on the selected clothing models and the clothing models selected in step (2). If it is not suitable for mixed washing, the system reminds users and users can manually select whether to cancel the clothing models selected this time according to the reminder, and then step (3) is executed. If not, step (3) is executed.

When the next piece of clothing model selected and the previously selected clothing model are in the same category, and if no more clothing model is selected after this selection and colors of all the selected clothing models are suitable for mixed washing, the system directly recommends washing parameters of the category, refer to Table 3 for washing parameters information table of corresponding clothing. For example, the selected clothing model is one jeans coat, a next piece of clothing model selected is jeans trousers, and the washing parameters recommended by the system at least are: rinsing for 2 times, dehydrating for 3 minutes, the temperature is set to 30° C. and the washing time is 15 minutes.

Referring to the level classification shown in Table 2 above, clothing in low levels of washing strength are not suitable for mixed washing with clothing in high levels of washing strength. For example, clothing of special class is not suitable for mixed washing with clothing of other classes, or underwear is not suitable for mixed washing with other clothing, clothing easy to fade is not suitable for mixed washing with clothing of light colors and so on.

(3) The system analyzes whether the total weight of the selected clothing is less than the rated washing weight, if not, the system reminds users and users can select whether to finish selecting clothing according to the reminder. If yes, users select whether to finish selecting clothing base on needs, if users select to finish selecting clothing, then execute step (4); if not, execute step (2).

Qualities corresponding to all clothing models are already set in the system, and qualities are set corresponding to each type of clothing referring to Table 2 above. The total weight of the selected clothing models is obtained based on the cumulative weight of the clothing models selected by users.

(4) The system initiates intelligent calculations based on the selected clothing models and analyzes whether the selected clothing models includes clothing models from special class. If clothing models of special class is not included, the system counts the total weight of various types of clothing models, and obtains the name of clothing model with the largest total weight. Otherwise, the system counts the total weight of various types from the special class and obtains the name of the clothing model with the largest total weight. Determine whether types of clothing with the largest total weight are more than two, if not, execute step (5); otherwise, the system obtains the name of the selected clothing of the lowest level of washing strength, execute step (5).

In particular, clothing of special class is usually of low washing strength, and is not suitable for mixed washing with other clothing, for example, special class such as jacket, sweater and down jacket are not suitable for mixed washing with clothing of other classes. For example, when two or three of the cotton and linen, chemical fiber and jeans in the clothing category are selected, the preferred washing procedure is displayed as mixing.

(5) Search the database according to names of clothing and obtains washing parameters. The washing parameters include washing time, washing temperature, rinsing times, dehydration time and dehydrating rotation speed. Select one of additional functions such as drying, detergent, softener, or the combination thereof, in the additional function module.

In particular, the cotton and linen, chemical fiber, mixed in the washing procedure are corresponding to different ratios of rotating to stopping and limit values of washing parameters and so on.

(6) Click on the start item, the system sends washing parameters to the intelligent washing machine, and the intelligent washing machine performs the corresponding operation.

Further, the intelligent washing machine at least comprises a communication module and a control module. The communication module is communicatively connected with the intelligent clothing washing management device. The communication module receives an operation instruction transmitted by the intelligent clothing washing management device and sends operation instructions to the control module. The control module controls the intelligent washing machine to perform corresponding operations in accordance with washing parameters set by the intelligent clothing washing management device. The washing parameters include washing time, washing temperature, rotation speed, soaking time, rinsing time, dehydration time and water level. The intelligent clothing washing management device is provided on an intelligent terminal.

The control module invokes corresponding washing parameters according to operation instructions to control the operation of the intelligent washing machine. For example, the intelligent clothing washing management device sets a washing time as 8 minutes, a temperature as 25° C. After the intelligent clothing washing management device gets communicatively connected with the intelligent washing machine, the intelligent washing machine receives the operation instructions, carries out that the washing time is 8 minutes and the temperature is 25° C. according to the operation instructions and provides feedback via the communication module. For example, the intelligent washing machine sends information of service states to the intelligent clothing washing management device, or the intelligent washing machine receives searching instructions from the intelligent clothing washing management device and transmits the feedback of the data of operation states to the intelligent clothing washing management device to provide to users.

During the use of the intelligent clothing washing management device provided in the present disclosure, when users select to wash clothing of various types, different materials and different colors, the most appropriate washing procedure is automatically recommended through analysis and processing. It greatly meets the user's washing needs and objectives, a variety of clothing during the mixed washing are not easy to be damaged and deformed and fading clothing are contaminated with each other and so on. It brings users more convenience.

The embodiments above may be further combined or replaced, and the embodiments are merely illustrative of the preferred embodiments of the disclosure and are not intended to limit the idea and scope of the disclosure. Various changes and modifications in the technical solutions of the present disclosure by those skilled in the art are within the scope of the present disclosure, without departing from the design concept of the present disclosure.

The invention claimed is:

1. A method for washing clothing by an intelligent clothing washing management device, comprising following steps:
   S1: selecting one or more of clothing types displayed on a clothing module and displaying a selected clothing model in an area to be washed;
   S2: analyzing and automatically recommending, by a washing procedure recommendation module, washing parameters according to the selected clothing model;
   S3: applying the washing parameters displayed and recommended by: receiving, by a processing module, washing parameters recommended by the washing procedure recommendation module and controlling a washing device to perform a wash using the recommended washing parameters; wherein the washing parameters at least include washing time, washing temperature and rotation speed;

the clothing module includes the clothing model and the clothing types, the clothing types at least include strong class, gentle class, jeans class, large stuff class, special class and stubborn class according to classification by clothing washing strength, and when a user selects the clothing model in a same level, the intelligent clothing washing management device recommends the washing parameters corresponding to the level, when the user selects the clothing model in different levels: if the clothing model at least includes special class, the intelligent clothing washing management device recommends washing parameters corresponding to the clothing model with a greatest cumulative weight in the special class; if the clothing model includes multiple items of strong class, gentle class, jeans class, large stuff class and stubborn class except for special class, the intelligent clothing washing management device recommends washing parameters corresponding to the clothing model with the greatest cumulative weight.

2. The method according to claim 1, wherein, in step S1, when the clothing type displayed is selected, times that each type of clothing is selected indicates that the type of clothing is selected for several pieces.

3. The method according to claim 1, wherein, in step S1, clothing model in the to-be-washed area is cancellable.

4. The method according to claim 1, wherein, in step S2, if clothing model selected is not suitable for mixed washing and/or is beyond a preset weight during analyzing, reminder automatically pops up.

5. The method according to claim 1, wherein, the washing parameters further include soaking time, rinsing time, dehydration time and water level.

6. The method according to claim 1, wherein, the clothing types at least include strong class, gentle class, jeans class, large stuff class, special class and stubborn class according to classification by clothing washing strength.

7. The method according to claim 1, wherein, the clothing model in the clothing module is stored in a storage module, the storage module also stores preferred washing parameters corresponding to the clothing model, and preferred washing parameters are recommended based on the information of the selected clothing model stored through the storage module.

8. The method according to claim 1, wherein, when a plurality of categories according to the displayed clothing types are selected and at least special class are included, the preferred washing parameters are the washing parameters corresponding to clothing model with a greatest cumulative weight under the special class.

9. The method according to claim 1, wherein, when strong class, gentle class, jeans class, large stuff class and stubborn class are selected as a plurality of categories from the displayed clothing types, the preferred washing parameters are the washing parameters corresponding to clothing model with the greatest cumulative weight.

10. The method according to claim 1, wherein, the intelligent clothing washing management device further comprises an additional function module which recommends preferred washing parameters according to the washing procedure recommendation module, the additional function module is set and displayed at an intelligent terminal and is selectable and operable, and the additional function module includes additional functions selected from any one of drying, adding a detergent, a softener or a combination thereof.

11. The method according to claim 1, wherein: the intelligent clothing washing management device, at least comprising the clothing module, the washing procedure recommendation module, a storage module and the processing module, the intelligent clothing washing management device is arranged on an intelligent terminal which is communicatively connected with the washing device, and the washing procedure recommendation module, according to clothing model selected by the clothing module, recommends preferred washing parameters by information stored in the storage module, and the processing module receives the washing parameters recommended by the washing procedure recommendation module and controls the washing device.

12. The method according to claim 11, further comprising a voice module which is connected with the clothing module and the processing module respectively, wherein:

the voice module receives voice information input by a microphone of the intelligent terminal and clothing model is selected in the clothing module by entering the voice information, and the washing procedure recommendation module, according to the information stored in the storage module for the clothing model selected, recommends preferred washing parameters, and the processing module further analyses and processes the washing parameters and controls the washing device.

13. The method according to claim 11, wherein, the clothing module includes clothing types and clothing information which at least includes clothing materials and clothing colors, and the clothing types at least includes strong class, gentle class, jeans class, large stuff class, special class and stubborn class according to classification by clothing washing strength.

14. The method according to claim 13, wherein, the clothing information further includes clothing name, washing strength, clothing classification and clothing weight.

15. The method according to claim 11, wherein, the storage module stores clothing model in the clothing module and washing parameters corresponding to one type of clothing model and/or a mixture of more than one type of clothing models, and the washing parameters include washing time, washing temperature and rotation speed.

16. The method according to claim 15, wherein, the washing parameters further include soaking time, rinsing time, dehydration time and water level.

17. The method according to claim 11, further comprising an additional function module which selected preferred washing parameters according to the washing procedure recommendation module, the additional function module is set and displayed on the intelligent terminal and is selectable and operable, and the additional function module includes additional functions selected from any one of drying, adding a detergent, a softener or a combination thereof.

18. The method according to claim 11, further comprising a reminder module, and the reminder module reminds that clothing selected is not suitable for mixed washing and/or is beyond a preset weight.

* * * * *